United States Patent
Imada

(10) Patent No.: US 9,732,216 B2
(45) Date of Patent: Aug. 15, 2017

(54) RESIN COMPOSITION AND RESIN MOLDED ARTICLE

(71) Applicant: FUJI XEROX CO., LTD., Tokyo (JP)

(72) Inventor: Akira Imada, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 29 days.

(21) Appl. No.: 14/801,484

(22) Filed: Jul. 16, 2015

(65) Prior Publication Data

US 2016/0208092 A1 Jul. 21, 2016

(30) Foreign Application Priority Data

Jan. 19, 2015 (JP) ................................ 2015-007902

(51) Int. Cl.
| | |
|---|---|
| *C08L 51/00* | (2006.01) |
| *C08L 67/02* | (2006.01) |
| *C08L 51/06* | (2006.01) |

(52) U.S. Cl.
CPC ............... *C08L 67/02* (2013.01); *C08L 51/00* (2013.01); *C08L 51/06* (2013.01)

(58) Field of Classification Search
None
See application file for complete search history.

(56) References Cited

U.S. PATENT DOCUMENTS

| | | | | |
|---|---|---|---|---|
| 5,369,154 A | * | 11/1994 | Laughner | ................ C08L 67/00 523/436 |
| 2004/0254270 A1 | * | 12/2004 | Harashina | ................ C08K 3/24 524/86 |
| 2012/0192944 A1 | * | 8/2012 | Aoyama | ............... H01L 31/048 136/256 |
| 2015/0321822 A1 | * | 11/2015 | Moritz | ................... B65D 81/24 53/452 |

FOREIGN PATENT DOCUMENTS

| | | |
|---|---|---|
| JP | H08-259772 A | 10/1996 |
| JP | 2001-335699 A | 12/2001 |

* cited by examiner

*Primary Examiner* — Jeffrey Mullis
(74) *Attorney, Agent, or Firm* — Oliff PLC

(57) ABSTRACT

A resin composition includes a polystyrene resin; a polyethylene terephthalate resin; and a glycidyl group-containing polyethylene graft copolymer, wherein a content of the polystyrene resin is from 10% by weight to 40% by weight and a content of the polyethylene terephthalate resin is from 60% by weight to 90% by weight, with respect to a total amount of the polystyrene resin and the polyethylene terephthalate resin, a content of the glycidyl group-containing polyethylene graft copolymer is from 3% by weight to 20% by weight with respect to 100 parts by weight of a total amount of the polystyrene resin and the polyethylene terephthalate resin, and the glycidyl group-containing polyethylene graft copolymer is a copolymer obtained by graft-polymerizing a polymerizable vinyl monomer to a main chain of a polyethylene copolymer constituted with a glycidyl group-containing (meth)acrylic acid ester unit and an ethylene unit.

11 Claims, No Drawings

RESIN COMPOSITION AND RESIN MOLDED ARTICLE

CROSS-REFERENCE TO RELATED APPLICATIONS

This application is based on and claims priority under 35 USC 119 from Japanese Patent Application No. 2015-007902 filed Jan. 19, 2015.

BACKGROUND

1. Technical Field

The invention relates to a resin composition and a resin molded article.

2. Related Art

In the related art, various resin compositions are provided to be used for various applications. For example, the resin compositions are used in resin molded articles such as various housings and components of home appliances or automobiles, or used in resin molded articles such as housings of business machines and electric and electronic apparatuses.

A polyethylene terephthalate resin is a resin having excellent heat resistance and satisfactory molding fluidity and a polystyrene resin is a resin which is inexpensive and has excellent moldability and dimensional stability when being molded. These are widely used as resin molded articles such as components and housings, in the field of machines, automobiles, electric equipment, and electronic equipment.

Recently, enhancement of surface impact strength of a resin molded article obtained from a resin composition containing a polyethylene terephthalate resin and a polystyrene resin is required.

SUMMARY

According to an aspect of the invention, there is provided a resin composition including:

a polystyrene resin;
a polyethylene terephthalate resin; and
a glycidyl group-containing polyethylene graft copolymer, wherein a content of the polystyrene resin is in a range of 10% by weight to 40% by weight, and a content of the polyethylene terephthalate resin is in a range of 60% by weight to 90% by weight, with respect to a total amount of the polystyrene resin and the polyethylene terephthalate resin, wherein a content of the glycidyl group-containing polyethylene graft copolymer is in a range of 3% by weight to 20% by weight with respect to 100 parts by weight of a total amount of the polystyrene resin and the polyethylene terephthalate resin, and wherein the glycidyl group-containing polyethylene graft copolymer is a copolymer obtained by graft-polymerizing a polymerizable vinyl monomer to a main chain of a polyethylene copolymer constituted with a glycidyl group-containing (meth)acrylic acid ester unit and an ethylene unit.

DETAILED DESCRIPTION

An exemplary embodiment of the invention is described as follows. The exemplary embodiment is an example for realizing the invention, and the invention is not limited to the exemplary embodiment.

Resin Composition

The resin composition according to the exemplary embodiment is a resin composition containing a polystyrene resin, a polyethylene terephthalate resin, and a glycidyl group-containing polyethylene graft copolymer. Also, in the resin composition, with respect to a total amount of the polystyrene resin and the polyethylene terephthalate resin, the content of the polystyrene resin is in the range of 10% by weight to 40% by weight, and the content of the polyethylene terephthalate resin is in the range of 60% by weight to 90% by weight, and the content of the glycidyl group-containing polyethylene graft copolymer is in the range of 3% by weight to 20% by weight with respect to 100 parts by weight of the total amount of the polystyrene resin and the polyethylene terephthalate resin. Also, the glycidyl group-containing polyethylene graft copolymer is a copolymer obtained by graft-polymerizing the polymerizable vinyl monomer to the main chain of the polyethylene copolymer constituted with the glycidyl group-containing a (meth)acrylic acid ester unit and an ethylene unit.

The resin composition according to the exemplary embodiment has enhanced surface impact strength of the obtainable resin molded article, compared with the resin composition made of the polystyrene resin and the polyethylene terephthalate resin. Though not clear, the following reasons are assumed for this mechanism.

In general, when the resin composition containing the polyethylene terephthalate resin of which the content is relatively large and the polystyrene resin of which the content is relatively small is molded, a sea-island structure in which the polyethylene terephthalate resin becomes a sea and the polystyrene resin becomes an island is formed. It is considered that the starting point of break when an impact is applied to a molded article having the sea-island structure is mainly an interface between the island (polystyrene) and the sea (polyethylene terephthalate resin). In the resin composition according to the exemplary embodiment, the terminal group of the polyethylene terephthalate resin and the glycidyl group of the glycidyl group-containing polyethylene graft copolymer react with each other, so that polyethylene terephthalate is caused to have a high molecular weight and the polymerizable vinyl monomer in the graft copolymer is compatible with the polystyrene resin. Therefore, it is considered that the polystyrene resin is dispersed in the resin composition, and thus an uneven distribution is prevented. As a result, it is considered that the strength of the interface between the sea and the island is increased. In addition, it is considered that the glycidyl group-containing polyethylene graft copolymer functions as an elastomer having a rubber-shaped elastic member by cooling. It is considered that this contributes to the enhancement of the surface impact strength of the resin molded article obtained from the resin composition according to the exemplary embodiment.

Hereinafter, respective components constituting the resin composition according to the exemplary embodiment are described.

Polystyrene Resin

The polystyrene resin is not particularly limited, as long as the polystyrene resin is a polymer containing a constituent unit derived from styrene. The polystyrene resin may be a homopolymer of styrene, or may be a copolymer of a compound having a double bond between carbons copolymerized with styrene.

Examples of the polystyrene resin include general purpose polystyrene (GPPS) which is a homopolymer of styrene, impact resistant polystyrene (HIPS) obtained by adding rubber such as butadiene to GPSS, styrene-acrylonitrile resin (SAN) obtained by copolymerizing styrene and acrylonitrile, and an acrylonitrile-butadiene-styrene resin (ABS resin).

The content of the polystyrene resin is not particularly limited, as long as the content is in the range of 10% by weight to 40% by weight with respect to the total amount of the polystyrene resin and the polyethylene terephthalate resin. For example, the content is preferably in the range of 20% by weight to 30% by weight. If the content of the polystyrene resin is less than 10% by weight or greater than 40% by weight, the surface impact strength of the resin molded article may be decreased due to the deterioration of the molding fluidity of the resin or the like, compared with the case in which the above range is satisfied.

For example, the weight average molecular weight of the polystyrene resin is preferably in the range of 1,000 to 100,000, and more preferably in the range of 5,000 to 50,000. The number average molecular weight of the polystyrene resin is preferably in the range of 1,000 to 50,000, and more preferably in the range of 5,000 to 10,000. If the weight average molecular weight of the polystyrene resin is less than 1,000, and the number average molecular weight is less than 1,000, the fluidity of the resin composition becomes excessive so that workability of the resin molded article may be deteriorated. If the weight average molecular weight of the polystyrene resin is greater than 100,000, and the number average molecular weight is greater than 50,000, the fluidity of the resin composition be deteriorated, so that workability of the resin molded article may be deteriorated.

The weight average molecular weight and the number average molecular weight are measured by gel permeation chromatography (GPC). The measurement of the molecular weight by GPC is performed by using GPC, HLC-8120 manufactured by Tosoh Corporation as a measuring apparatus, with a column, TSKgel Super HM-M (15 cm) manufactured by Tosoh Corporation, in a hexafluoro isopropanol solvent. The weight average molecular weight and the number average molecular weight are calculated by using a molecular weight calibration curve prepared by a monodispersed polystyrene standard sample from the measurement results. In the following, the weight average molecular weight and the number average molecular weight are measured in the same manner.

Polyethylene Terephthalate Resin

The content of the polyethylene terephthalate resin is not particularly limited, as long as the content is in the range of 60% by weight to 90% by weight with respect to the total amount of the polystyrene resin and the polyethylene terephthalate resin. For example, the content is preferably in the range of 70% by weight to 80% by weight. If the content of the polyethylene terephthalate resin is less than 60% by weight or greater than 90% by weight, the surface impact strength of the resin molded article may be deteriorated due to the deterioration of molding fluidity of the resin or the like, compared with the case in which the above range is satisfied.

The weight average molecular weight of the polyethylene terephthalate resin according to the exemplary embodiment is preferably, for example, in a range of 5,000 to 100,000. Also, the number average molecular weight of the polyethylene terephthalate resin according to the exemplary embodiment is preferably, for example, in a range of 5,000 to 50,000. If the weight average molecular weight of the polyethylene terephthalate resin is less than 5,000 and the number average molecular weight is less than 5,000, fluidity of the resin composition may be increased to deteriorate workability of the resin molded article, compared with the case in which the above range is satisfied. In addition, if the weight average molecular weight of the polyethylene terephthalate resin exceeds 100,000 and the number average molecular weight exceeds 50,000, fluidity of the resin composition may be deteriorated to deteriorate workability of the resin molded article, compared with the case in which the above range is satisfied.

The acid value of the polyethylene terephthalate resin according to the exemplary embodiment is preferably in the range of 10 eq/t to 15 eq/t. If the acid value of the polyethylene terephthalate resin is in the range of 10 eq/t to 15 eq/t, since there are many terminal groups that react with the glycidyl group, compared with the case where the acid value of the polyethylene terephthalate resin is less than 10 eq/t, the polyethylene terephthalate resin is caused to have a high molecular weight, and thus it is considered that the surface impact strength of the resin molded article is further enhanced. In addition, the excessive reaction with the glycidyl group is prevented, compared with the case where the acid value of the polyethylene terephthalate resin is greater than 15 eq/t, and thus it is considered that the gelation of the polyethylene terephthalate component is prevented. Also, if the gelation of the polyethylene terephthalate component is prevented, the deterioration of the molding fluidity in the resin composition is prevented, and thus it is considered that the surface impact strength is further enhanced. The acid value of polyethylene terephthalate is adjusted by the solid phase polymerization. In addition, the measurement method of the acid value is described in the examples.

The polyethylene terephthalate resin according to the exemplary embodiment preferably contains the polyethylene terephthalate resin (hereinafter, also referred to as "recycled PET resin" in some cases) collected from the market. In recycled PET resin, the hydrolysis progresses, compared with the PET resin before being released to the market, and thus the recycled PET resin is easily caused to be a PET resin having the acid value in the range of 10 eq/t to 15 eq/t. Therefore, it is considered that the surface impact strength of the resin molded article is enhanced.

For example, the recycled PET resin is prepared by collecting the resin molded article of the PET resin from the market, and pulverizing the collected resin molded articles with a crusher such as a dry-type or a wet-type crusher. For example, the content of the recycled PET resin is preferably 30% or greater and more preferably 40% or greater, of the aromatic polyester resin (B) contained in the resin composition. If the content of the recycled PET resin is 30% or greater, it is considered that the tensile elongation at break of the resin molded article may be deteriorated, compared with the case in which the above range is not satisfied.

Glycidyl Group-Containing Polyethylene Graft Copolymer

The glycidyl group-containing polyethylene graft copolymer is a copolymer obtained by graft-polymerizing a polymerizable vinyl monomer to the main chain of the polyethylene copolymer constituted with the ethylene unit and the glycidyl group-containing (meth)acrylic acid ester unit. The content of the glycidyl group-containing polyethylene graft copolymer is not particularly limited, as long as the content is in the range of 3% by weight to 20% by weight with respect to the 100 parts by weight of the total amount of the polystyrene resin and the polyethylene terephthalate resin. For example, the content is preferably in the range of 5% by weight to 12% by weight. If the content of the glycidyl group-containing polyethylene graft copolymer is less than 3% by weight, the compatibility of the polystyrene is deteriorated, compared with the case in which the above range is satisfied, so that the surface impact strength of the resin molded article may be deteriorated due to the uneven distribution of the polystyrene in the resin composition or the like. In addition, if the content of the glycidyl group-containing polyethylene graft copolymer is greater than 20% by weight, the surface impact strength of the resin molded article may be deteriorated due to the deterioration of the molding fluidity of the resin, or the like, compared with the case in which the above range is satisfied.

Examples of the glycidyl group-containing (meth)acrylic acid ester unit include a constituent unit derived from a monomer such as glycidyl (meth)acrylate, vinyl glycidyl ether, (meth)acryl glycidyl ether, 2-methyl propenyl glycidyl ether, styrene-p-glycidyl ether, glycidyl cinnamate, itaconic acid glycidyl ester, and N-[4-(2,3-epoxypropoxy)-3,5-dimethyl benzyl]methacrylamide. In addition, "(meth)acryl" means acryl or methacryl.

The content of the glycidyl group-containing (meth) acrylic acid ester unit in the glycidyl group-containing polyethylene graft copolymer is preferably in the range of 5% by weight to 20% by weight, and the glass transition point of the polyethylene copolymer which is the main chain is preferably 0° C. or lower. If the content of the glycidyl group-containing (meth)acrylic acid ester unit in the glycidyl group-containing polyethylene graft copolymer is less than 5% by weight, the polyethylene terephthalate resin may be unlikely to have a high molecular weight, compared with the case in which the above range is satisfied, and if the content is greater than 20% by weight, fluidity of the resin composition may be deteriorated, compared with the case in which the above range is satisfied, so that the workability of the resin molded article is deteriorated. In addition, if the glass transition point of the polyethylene copolymer which is the main chain is higher than 0° C., elasticity of the obtainable resin molded article may be deteriorated, compared with the case where the glass transition point is 0° C. or lower.

The glass transition point of the polyethylene copolymer means a glass transition point measured as follows. That is, a calorie spectrum is measured under a condition of temperature rising rate of 10° C. per minute with a differential calorimeter device (differential scanning calorimeter device DSC-60 manufactured by Shimadzu Corporation), and an intermediate value (Tgm) of two shoulder values obtained by a tangent line method from peaks derived from glass transition is set to be a glass transition point.

An example of a method of manufacturing the glycidyl group-containing polyethylene copolymer is described. For example, a polyethylene copolymer which becomes a main chain by living-polymerizing a monomer constituting an ethylene unit and a monomer constituting a glycidyl group-containing (meth)acrylic acid ester unit is obtained. Then, a polymerizable vinyl monomer is added to the polyethylene copolymer, and the radical polymerization is performed, so that the glycidyl group-containing polyethylene graft copolymer is obtained. In addition, examples of the living polymerization include an anionic polymerization method under the presence of a mineral acid salt such as salt of alkali metal or alkali earth metal by using an organic alkali metal compound as a polymerization initiator, an anionic polymerization method under the presence of an organic aluminum compound by using an organic alkali metal compound as a polymerization initiator, a polymerization method using an organic rare earth metal complex as a polymerization initiator, and a radical polymerization method under the presence of a copper compound by using an α-halogenized ester compound as an initiator.

Examples of the polymerizable vinyl monomer include an ester vinyl monomer unit, an aromatic vinyl monomer unit, and a vinyl cyanide monomer unit. Examples of the ester vinyl monomer unit include methyl (meth)acrylate, ethyl (meth)acrylate, butyl (meth)acrylate, isobutyl (meth)acrylate, and 2-ethylhexyl (meth)acrylate. Examples of the aromatic vinyl monomer include styrene and vinylnaphthalene. Examples of the vinyl cyanide monomer include acrylonitrile, α-chloroacrylonitrile, and methacrylonitrile. Among these, in view of the compatibility with the polystyrene resin, the aromatic vinyl monomer is preferable, and styrene is particularly preferable.

For example, the weight average molecular weight of the glycidyl group-containing polyethylene graft copolymer is preferably from 3,000 to 100,000. If the weight average molecular weight of the glycidyl group-containing polyethylene graft copolymer is less than 3,000, the impact resistance may be deteriorated, compared with the case in which the above range is satisfied, and if the weight average molecular weight of the glycidyl group-containing polyethylene graft copolymer exceeds 100,000, the dispersibility in the resin composition may be deteriorated, compared with the case in which the above range is satisfied.

Other Components

The resin composition according to the exemplary embodiment may contain other components as long as the surface impact strength of the obtainable resin molded article is not deteriorated. Examples of the other components include a hydrolysis inhibitor, an antioxidant, and a filler.

Examples of the hydrolysis inhibitor include a carbodiimide compound, and an oxazoline compound. Examples of the carbodiimide compound include dicyclohexylcarbodiimide, diisopropylcarbodiimide, dimethylcarbodiimide, diisobutyl carbodiimide, dioctyl carbodiimide, diphenyl carbodiimide, and naphthylcarbodiimide.

Examples of the antioxidant include phenol, amine, phosphorus, sulfur, hydroquinone, and quinoline antioxidants.

Examples of the filler include clay such as kaolin clay, bentonite clay, kibushi clay, and gairome clay, talc, mica, and montmorillonite.

Resin Molded Article

The resin molded article according to the exemplary embodiment includes a resin composition according to the exemplary embodiment. For example, the aforementioned resin composition according to the exemplary embodiment is molded, for example, by a molding method such as injection molding, extrusion molding, blow molding, and hot press molding, to obtain the resin molded article according to the exemplary embodiment. According to the exemplary embodiment, in view of the dispersibility of the respective components in the resin molded article, the resin molded article is preferably obtained by injection-molding the resin composition according to the exemplary embodiment.

The injection molding may be conducted by using a commercially available apparatus such as "NEX 150" and "NEX 70000" manufactured by Nissei Plastic Industrial Co., Ltd., and "SE50D" manufactured by Toshiba Machine Co., Ltd. In this case, in view of the compatibilization of a polystyrene resin, a cylinder temperature is preferably from 170° C. to 280° C. In addition, in view of productivity and the like, a mold temperature is preferably from 30° C. to 120° C.

The resin molded article according to the exemplary embodiment is preferably used for electronic and electrical apparatuses, home appliances, containers, and interior materials for automobiles. More specifically, examples of the usage include housings, various components, or the like of home appliances or electronic and electrical apparatuses, wrapping films, storage cases of CD-ROM, DVD, or the like, tableware, food trays, drink bottles, and medicine wrapping materials. Among these, the resin molded article according to the exemplary embodiment is preferably used for components of electronic and electrical apparatuses. Specifically, the components of electronic and electrical apparatuses require high impact resistance and flame retardance. Also, the resin molded article according to the exemplary embodiment which is obtainable from the resin composition described above has enhanced surface impact strength, compared with the resin molded article obtainable from a resin composition formed of a polystyrene resin and a polyethylene terephthalate resin.

EXAMPLES

The invention is described more specifically in detail with reference to examples and comparative examples, but the invention is not limited to the following examples.

Polystyrene Resin

The polystyrene resin (hereinafter, referred to as PS resin) used in the examples and comparative examples are as follows. PS resin A-1 is a general purpose polystyrene (GPPS) "HF77" manufactured by PS Japan Corporation, PS resin A-2 is an impact resistant polystyrene (HIPS) "H8672" manufactured by PS Japan Corporation, and PS resin A-3 is recycled HIPS "LK55" manufactured by Luen Kee Plastic Materials Factory.

Polyethylene Terephthalate Resin

Polyethylene terephthalate resins (hereinafter, referred to as "PET resin") used in the examples and the comparative examples are as follows. PET resin B-1 is "J125" manufactured by Mitsui Chemicals, Inc., PET resin B-2 is a PET fiber-derived recycled PET resin, PET resin B-3 is a PET drink bottle-derived recycled PET resin, and PET resin B-4 is a PET film-derived recycled PET resin.

In Table 1, MVR ($cm^3/10$ min) of the PS resins A-1 to A-3, and acid values of the PET resins B-1 to B-4 are collectively presented.

Melt Volume Rate (MVR)

MVR is a numerical value expressing fluidity of a resin being melted, and a value obtained by measurement in conformity with ISO 1133. Specifically, the value is obtained by melting a resin in a cylinder and measuring an amount of the resin extruded from a dice having a prescribed diameter provided in the bottom portion of a cylinder for 10 minutes under the conditions of a temperature of 230° C. and a load of 2.16 kg.

Measurement of Acid Value

The acid value of the PET resin is measured in the following procedure.

Preparation of Sample

A sample is pulverized, is vacuum-dried for 24 hours at 70° C., and is weighed in a range of 0.20±0.0005 g using a scale. The weight at the point is set to be W (g). 10 ml of benzyl alcohol and the weighed sample are put into a test tube, the test tube is immersed into an oil bath heated to 205° C., and the sample is dissolved for a prescribed dissolving time while stirred by a glass rod. The samples having a dissolving time of 3 minutes, 5 minutes, and 7 minutes are referred to as A, B, and C, respectively. Subsequently, only benzyl alcohol is put in a test tube and treated in the same procedure as above. The samples having a dissolving time of 3 minutes, 5 minutes, and 7 minutes are referred to as a, b, and c, respectively.

Titration

With respect to the samples prepared above, titration is performed by using 0.04 mol/l of potassium hydroxide solution (ethanol solution) of which the factor is confirmed in advance. Phenol red is used as an indicator, a point at which the color of the sample is changed from yellowish green to pink is set to be the end point, and the titration amount (ml) of the potassium hydroxide solution at the end point is obtained. The titration amounts of the samples A, B, and C are referred to as XA, XB, and XC (ml), respectively, and the titration amounts of the samples a, b, and c are referred to as Xa, Xb, and Xc (ml), respectively.

Calculation of Acid Value

The titration amount V (ml) at the dissolving time of 0 minute is obtained in the least-squares method using the titration amounts XA, XB, and XC for the respective dissolving times. In the same manner, the titration amount V0 (ml) is obtained by using Xa, Xb, and Xc. Subsequently, the acid value is obtained by the following equation.

$$\text{Acid value (eq/t)} = [(V-V0) \times 0.04 \times NF \times 1,000]/W$$

NF: Factor of 0.04 mol/l of potassium hydroxide solution
W: Weight of sample (g)

TABLE 1

| Polystyrene resin | | MVR ($cm^3/10$ min) |
|---|---|---|
| PS Resin A-1 | HF77 (PS Japan Corporation) | 7.8 |
| PS Resin A-2 | H8672 (PS Japan Corporation) | 4.1 |
| PS Resin A-3 | LK55 (Luen Kee Plastic Materials Factory) | 7.2 |

| Polyethylene terephthalate resin | | Acid value (eq/t) |
|---|---|---|
| PET Resin B-1 | J125 (Mitsui Chemicals, Inc.) | 7 |
| PET Resin B-2 | PET fiber-derived product | 10 |
| PET Resin B-3 | PET drink bottle-derived product | 15 |
| PET Resin B-4 | PET film-derived product | 18 |

Glycidyl Group-Containing Polyethylene Graft Copolymer C-1

A glycidyl group-containing polyethylene graft copolymer C-1 is "Modiper A4100" manufactured by NOF Corporation, and is a copolymer obtained by graft-polymerizing styrene, as a vinyl monomer, to the main chain of a glycidyl methacrylate/ethylene copolymer. The composition ratio of glycidyl methacrylate/ethylene/styrene is 9/61/30 (% by weight). The glass transition point (Tg) of the glycidyl methacrylate/ethylene copolymer is −45° C.

Glycidyl Group-Containing Polyethylene Graft Copolymer C-2

5 parts by weight of glycidyl methacrylate, and 0.5 parts by weight of dialkyl peroxide (Product name: Perhexa 25B manufactured by NOF Corporation) are uniformly mixed with 65 parts by weight of polyethylene (Product name: Nipolon-Z 1P53A manufactured by Tosoh Corporation) in a Henschel mixer. Thereafter, the resultant is extruded at a cylinder temperature of 220° C. with a twin screw extruder (Product name: TEM-35 manufactured by Toshiba Machine Co., Ltd.) to obtain an ethylene/glycidyl methacrylate copolymer, and 30 parts by weight of styrene as the vinyl monomer is graft-polymerized to obtain a glycidyl group-containing polyethylene graft copolymer C-2. The composition ratio of glycidyl methacrylate/ethylene/styrene is 5/65/30 (% by weight). The glass transition point (Tg) of the glycidyl methacrylate/ethylene copolymer is −51° C.

Glycidyl Group-Containing Polyethylene Graft Copolymer C-3

20 parts by weight of glycidyl methacrylate, 40 parts by weight of polyethylene, and 0.5 parts by weight of dialkylperoxide are extruded under the same condition as in the preparation of the copolymer C-2 to obtain an ethylene/glycidyl methacrylate copolymer, and 30 parts by weight of styrene as the vinyl monomer is graft-polymerized to obtain a glycidyl group-containing polyethylene graft copolymer C-3. The composition ratio of glycidyl methacrylate/ethylene/styrene is 20/40/30 (% by weight). The glass transition point (Tg) of the glycidyl methacrylate/ethylene copolymer is −30° C.

Glycidyl Group-Containing Polyethylene Graft Copolymer C-4

4 parts by weight of glycidyl methacrylate, 66 parts by weight of polyethylene, and 0.5 parts by weight of dialkylperoxide are extruded under the same condition as in the preparation of the copolymer C-2 to obtain an ethylene/glycidyl methacrylate copolymer, and 30 parts by weight of styrene as the vinyl monomer is graft-polymerized to obtain a glycidyl group-containing polyethylene graft copolymer C-4. The composition ratio of glycidyl methacrylate/ethylene/styrene is 4/66/30 (% by weight). The glass transition point (Tg) of the glycidyl methacrylate/ethylene copolymer is −51° C.

Glycidyl Group-Containing Polyethylene Graft Copolymer C-5

21 parts by weight of glycidyl methacrylate, 39 parts by weight of polyethylene, and 0.5 parts by weight of dialkylperoxide are extruded under the same condition as in the preparation of the copolymer C-2 to obtain an ethylene/glycidyl methacrylate copolymer, and 30 parts by weight of styrene as the vinyl monomer is graft-polymerized to obtain a glycidyl group-containing polyethylene graft copolymer C-5. The composition ratio of glycidyl methacrylate/ethylene/styrene is 21/39/30 (% by weight). The glass transition point (Tg) of the glycidyl methacrylate/ethylene copolymer is −29° C.

Glycidyl Group-Containing Polyethylene Graft Copolymer C-6

A glycidyl group-containing polyethylene graft copolymer C-6 is "Modiper A4400" manufactured by NOF Corporation, and is a copolymer obtained by graft-polymerizing styrene and acrylonitrile to the main chain of a glycidyl methacrylate/ethylene copolymer. The composition ratio of glycidyl methacrylate/ethylene/acrylonitrile/styrene is 9/61/9/21 (% by weight). The glass transition point (Tg) of the glycidyl methacrylate/ethylene copolymer is −45° C.

Glycidyl Group-Containing Polyethylene Graft Copolymer C-7

9 parts by weight of glycidyl methacrylate, 61 parts by weight of polyethylene, and 0.5 parts by weight of dialkyl peroxide are extruded in the same manner as the preparation of the copolymer C-2, to obtain an ethylene/glycidyl methacrylate copolymer, and 11 parts by weight of acrylonitrile and 19 parts by weight of styrene are graft-polymerized, to obtain a glycidyl group-containing polyethylene graft copolymer C-7. The composition ratio of glycidyl methacrylate/ethylene/acrylonitrile/styrene is 9/61/11/19 (% by weight). The glass transition point (Tg) of the glycidyl methacrylate/ethylene copolymer is −45° C.

Glycidyl Group-Containing Polyethylene Graft Copolymer C-8

A glycidyl group-containing polyethylene graft copolymer C-8 is "Modiper A4300" manufactured by NOF Corporation, and is a copolymer obtained by graft-polymerizing butyl acrylate and methyl methacrylate to the main chain of a glycidyl methacrylate/ethylene copolymer. The composition ratio of glycidyl methacrylate/ethylene/butyl acrylate/methyl methacrylate is 9/61/21/9 (% by weight). The glass transition point (Tg) of the glycidyl methacrylate/ethylene copolymer is −45° C.

Comparative Polymer C-9

A comparative polymer C-9 is "Modiper A1100" manufactured by NOF Corporation, and is a copolymer obtained by graft-polymerizing styrene to the main chain of an ethylene polymer. The composition ratio of ethylene/styrene is 70/30 (% by weight). The glass transition point (Tg) of the ethylene/styrene copolymer is −58° C.

Comparative Polymer C-10

A comparative polymer C-10 is "AX8900" manufactured by ARKEMA, and is a glycidyl methacrylate/ethylene/methyl acrylate copolymer. The composition ratio of glycidyl methacrylate/ethylene/methyl acrylate is 8/68/24 (% by weight). The glass transition point (Tg) thereof is −33° C.

Comparative Polymer C-11

8 parts by weight of glycidyl methacrylate, 62 parts by weight of ethylene, and 24 parts by weight of styrene are mixed to obtain a glycidyl methacrylate/ethylene/styrene copolymer. The composition ratio of glycidyl methacrylate/ethylene/styrene is 8/68/24 (% by weight), and the glass transition point (Tg) thereof is −33° C.

In Table 2, compositions of glycidyl group-containing polyethylene graft copolymers C-1 to C-8 and comparative polymers C-9 to C-11 are collectively presented.

TABLE 2

| | | | Glycidyl group-containing polyethylene graft copolymer | | | | | | | | Comparative polymer | | |
|---|---|---|---|---|---|---|---|---|---|---|---|---|---|
| | | | C-1 | C-2 | C-3 | C-4 | C-5 | C-6 | C-7 | C-8 | C-9 | C-10 | C-11 |
| Constituent components of main chain | Glycidyl group-containing (meth)acrylic acid ester unit | Glycidyl methacrylate | 9 | 5 | 20 | 4 | 21 | 9 | 9 | 9 | | 8 | 8 |
| | Others | Ethylene | 61 | 65 | 40 | 66 | 39 | 61 | 61 | 61 | 70 | 68 | 68 |
| | | Methyl methacrylate | | | | | | | | | | 24 | |
| | | Styrene | | | | | | | | | | | 24 |
| Constituent components of side chain | | Butyl acrylate | | | | | | | | 21 | | | |
| | | Methyl methacrylate | | | | | | | | 9 | | | |
| | | Acrylonitrile | | | | | | 9 | 11 | | | | |
| | | Styrene | 30 | 30 | 30 | 30 | 30 | 21 | 19 | | 30 | | |
| | | Tg (° C.) of main chain | −45 | −51 | −30 | −51 | −51 | −45 | −58 | −45 | −58 | −33 | −33 |

Example 1

In the compositions presented in Table 3 (all are presented with "parts by weight"), 40 parts by weight of the PS resin A-2, 60 parts by weight of the PET resin B-3, 6 parts by weight of the glycidyl group-containing polyethylene graft copolymer C-1, 0.2 parts by weight of the antioxidant (phenol antioxidant, Product name: "Irganox 1076" manufactured by BASF Japan Ltd.) are mixed in a tumbler, and are melted, kneaded, and extruded with a twin screw extruder provided with a vent (TEX-30α manufactured by The Japan Steel Works, LTD.), in a cylinder temperature and a dice temperature of 260° C., the number of screw rotations at 240 rpm, a suction degree of the vent of 100 MPa, and a discharging amount of 10 kg/h. Also, the discharged resin from the twin screw extruder is cut into a pellet shape, to obtain pellets.

The obtained pellet-shaped resin composition is dried with a hot air dryer at 90° C. for 4 hours, and injection-molded with an injection molding machine (Product name: "NEX500" manufactured by Toshiba Machine Co., Ltd.) at a cylinder temperature of 260° C. and a mold temperature of 60° C., to obtain a predetermined resin molded article (test piece for evaluation).

Example 2

A predetermined resin molded article (test piece for evaluation) is obtained under the same condition as in Example 1 except that the glycidyl group-containing polyethylene graft copolymer C-2 is used instead of the glycidyl group-containing polyethylene graft copolymer C-1.

Example 3

A predetermined resin molded article (test piece for evaluation) is obtained under the same condition as in Example 1 except that the glycidyl group-containing polyethylene graft copolymer C-3 is used instead of the glycidyl group-containing polyethylene graft copolymer C-1.

Example 4

A predetermined resin molded article (test piece for evaluation) is obtained under the same condition as in Example 1 except that the glycidyl group-containing polyethylene graft copolymer C-4 is used instead of the glycidyl group-containing polyethylene graft copolymer C-1.

Example 5

A predetermined resin molded article (test piece for evaluation) is obtained under the same condition as in Example 1 except that the glycidyl group-containing polyethylene graft copolymer C-5 is used instead of the glycidyl group-containing polyethylene graft copolymer C-1.

Example 6

A predetermined resin molded article (test piece for evaluation) is obtained under the same condition as in Example 1 except that the glycidyl group-containing polyethylene graft copolymer C-6 is used instead of the glycidyl group-containing polyethylene graft copolymer C-1.

Example 7

A predetermined resin molded article (test piece for evaluation) is obtained under the same condition as in Example 1 except that the glycidyl group-containing polyethylene graft copolymer C-7 is used instead of the glycidyl group-containing polyethylene graft copolymer C-1.

Example 8

A predetermined resin molded article (test piece for evaluation) is obtained under the same condition as in Example 1 except that the glycidyl group-containing polyethylene graft copolymer C-8 is used instead of the glycidyl group-containing polyethylene graft copolymer C-1.

Example 9

A predetermined resin molded article (test piece for evaluation) is obtained under the same condition as in Example 1 except that 10 parts by weight of the PS resin A-2 and 90 parts by weight of the PET resin B-3 are used.

Example 10

A predetermined resin molded article (test piece for evaluation) is obtained under the same condition as in Example 1 except that 3 parts by weight of the glycidyl group-containing polyethylene graft copolymer C-1 is used.

Example 11

A predetermined resin molded article (test piece for evaluation) is obtained under the same condition as in Example except that 20 parts by weight of the glycidyl group-containing polyethylene graft copolymer C-1 is used.

Example 12

A predetermined resin molded article (test piece for evaluation) is obtained under the same condition as in Example 1 except that the PS resin A-1 is used instead of the PS resin A-2.

Example 13

A predetermined resin molded article (test piece for evaluation) is obtained under the same condition as in Example 1 except that the PS resin A-3 is used instead of the PS resin A-2.

Example 14

A predetermined resin molded article (test piece for evaluation) is obtained under the same condition as in Example 1 except that the PET resin B-2 is used instead of the PET resin B-3.

Example 15

A predetermined resin molded article (test piece for evaluation) is obtained under the same condition as in Example 1 except that the PET resin B-4 is used instead of the PET resin B-3.

Example 16

A predetermined resin molded article (test piece for evaluation) is obtained under the same condition as in Example 1 except that the PET resin B-1 is used instead of the PET resin B-3.

Comparative Example 1

A predetermined resin molded article (test piece for evaluation) is obtained under the same condition as in Example 1 except that the comparative polymer C-9 is used instead of the glycidyl group-containing polyethylene graft copolymer C-1.

Comparative Example 2

A predetermined resin molded article (test piece for evaluation) is obtained under the same condition as in Example 1 except that the comparative polymer C-10 is used instead of the glycidyl group-containing polyethylene graft copolymer C-1.

Comparative Example 3

A predetermined resin molded article (test piece for evaluation) is obtained under the same condition as in Example 1 except that the comparative polymer C-11 is used instead of the glycidyl group-containing polyethylene graft copolymer C-1.

Comparative Example 4

A predetermined resin molded article (test piece for evaluation) is obtained under the same condition as in Example 1 except that the glycidyl group-containing polyethylene graft copolymer C-1 is not added.

Comparative Example 5

A predetermined resin molded article (test piece for evaluation) is obtained under the same condition as in Example 1 except that 50 parts by weight of the PS resin A-2 and 50 parts by weight of the PET resin B-3 are used.

Comparative Example 6

A predetermined resin molded article (test piece for evaluation) is obtained under the same condition as in Example 1 except that 21 parts by weight of the glycidyl group-containing polyethylene graft copolymer C-1 is used.

Evaluation and Test

The following evaluation and tests are performed by using the obtainable test pieces for evaluation. Compositions of the resin compositions of Examples 1 to 11 (all are presented using parts by weight) and test results below are collectively presented in Table 3, and compositions of the resin compositions of Examples 12 to 16 (all are presented using parts by weight), and test results below are collectively presented in Table 4. In addition, compositions of the resin compositions of Comparative Examples 1 to 6 (all are presented using parts by weight), and test results below are collectively presented in Table 5.

Test of Heat Resistance

In a state of applying a load (1.8 MPa) determined in a test method standard of ASTM D648 to a test piece, a temperature of the test piece for evaluation is increased, a temperature at which a size of deflection becomes a specific value (deflection temperature under load: DTUL) is measured. This is estimated as a heat resistant temperature.

Test of Tensile Strength, Tensile Elongation at Break and Modulus of Elasticity in Tension The tensile strength, the tensile elongation at break, and the modulus of elasticity in tension of the test piece are measured in conformity with JIS K-7113. Further, as a molded article, a test piece (thickness of 4 mm) of JIS1 obtained by injection molding is used. As a value of the tensile strength becomes greater, the tensile strength becomes better. As a value of the tensile elongation at break becomes greater, the tensile elongation at break becomes better. As a value of the modulus of elasticity in tension becomes greater, the rigidity becomes better.

Test of Impact Resistance

Charpy impact resistance strength (Unit: $kJ/m^2$) is measured by using a product obtained by performing a notch process on an ISO multipurpose dumbbell test piece, in conformity with ISO-179, with a digital impact tester (DG-5 manufactured by Toyo Seiki Seisaku-Sho Ltd.) in the MD direction, under the condition that a rising angle is 150°, an energy of the hammer used is 2.0 J, a number of measurement is n=10. As the value of the Charpy impact resistance strength becomes greater, the impact resistance becomes better Surface Impact Strength Test 60 mm×60 mm of a flat plate having a thickness of 2 mm is produced by injection molding, and a test piece obtained by cutting a 10 mm×10 mm square hole on the center of the flat plate is prepared. On the center of the test piece, a steel ball having a diameter of 50 mm and a weight of 500 g is dropped and impacted from the height in a range of 0.3 m to 1.3 m, and the surface impact strength is evaluated under the following conditions. The test of the surface impact strength is performed three times at respective heights. In addition, it is considered that it is preferable in practice to receive an "A" in the evaluation at the steel ball dropping height of 1.3 m.

A: No crack is formed around the square hole of the test piece

B: 1 to 3 cracks are formed around the square hole of the test piece

C: Test piece is broken into plural pieces

TABLE 3

| | Composition | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Resin Composition | PS Resin A-2 | 40 | 40 | 40 | 40 | 40 | 40 | 40 | 40 | 10 | 40 | 40 |
| | PET Resin B-3 | 60 | 60 | 60 | 60 | 60 | 60 | 60 | 60 | 90 | 60 | 60 |
| | Graft copolymer C-1 | 6 | | | | | | | | 6 | 3 | 20 |
| | Graft copolymer C-2 | | 6 | | | | | | | | | |
| | Graft copolymer C-3 | | | 6 | | | | | | | | |
| | Graft copolymer C-4 | | | | 6 | | | | | | | |
| | Graft copolymer C-5 | | | | | 6 | | | | | | |
| | Graft copolymer C-6 | | | | | | 6 | | | | | |
| | Graft copolymer C-7 | | | | | | | 6 | | | | |
| | Graft copolymer C-8 | | | | | | | | 6 | | | |
| | Antioxidant | 0.2 | 0.2 | 0.2 | 0.2 | 0.2 | 0.2 | 0.2 | 0.2 | 0.2 | 0.2 | 0.2 |

TABLE 3-continued

|  | Composition | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Evaluation result | | | | | | | | | | | | |
| Heat resistance | DTUL (1.8 MPa) | 71.0 | 70.5 | 70.3 | 70.2 | 70.1 | 71.0 | 69.8 | 68.0 | 69.0 | 72.1 | 68.9 |
| Mechanical characteristics | Tensile strength (MPa) | 55 | 54 | 54 | 53 | 53 | 53 | 52 | 50 | 58 | 52 | 52 |
|  | Tensile elongation at break (%) | 130 | 142 | 90 | 84 | 65 | 60 | 55 | 7 | 182 | 38 | 162 |
|  | Modulus of elasticity in tension (MPa) | 2200 | 2180 | 2120 | 2100 | 2110 | 2100 | 2120 | 2060 | 2110 | 2120 | 2210 |
|  | Charpy impact strength (kJ/m$^2$) | 18 | 16 | 14 | 11 | 10 | 9 | 8 | 3 | 12 | 9 | 19 |
| Surface impact strength | Dropping height 0.3 m | AAA | AAA | AAA | AAA | AAA | AAA | AAA | BBB | AAA | AAA | AAA |
|  | Dropping height 0.5 m | AAA | AAA | AAA | AAA | AAA | AAA | AAA | BBC | AAA | AAA | AAA |
|  | Dropping height 0.7 m | AAA | AAA | AAA | AAA | AAA | AAA | AAA | CCC | AAA | AAA | AAA |
|  | Dropping height 1.0 m | AAA | AAA | AAA | AAA | AAA | AAB | ABB | CCC | AAA | ABB | AAB |
|  | Dropping height 1.3 m | AAA | AAA | AAA | AAB | ABB | BBB | BBC | CCC | AAA | BBC | BBC |

TABLE 4

|  | Composition | Example 12 | Example 13 | Example 14 | Example 15 | Example 16 |
|---|---|---|---|---|---|---|
| Resin Composition | PS Resin A-1 | 40 | | | | |
|  | PS Resin A-2 | | | 40 | 40 | 40 |
|  | PS Resin A-3 | | 40 | | | |
|  | PET Resin B-1 | | | | | 60 |
|  | PET Resin B-2 | | | 60 | | |
|  | PET Resin B-3 | 60 | 60 | | | |
|  | PET Resin B-4 | | | | 60 | |
|  | Graft copolymer C-1 | 6 | 6 | 6 | 6 | 6 |
|  | Antioxidant | 0.2 | 0.2 | 0.2 | 0.2 | 0.2 |
| Evaluation result | | | | | | |
| Heat resistance | DTUL (1.8 MPa) | 71.6 | 72.4 | 70.5 | 70.1 | 68.5 |
| Mechanical characteristics | Tensile strength (MPa) | 55 | 56 | 54 | 53 | 52 |
|  | Tensile elongation at break (%) | 135 | 142 | 105 | 74 | 65 |
|  | Modulus of elasticity in tension (MPa) | 2100 | 2240 | 2140 | 2080 | 2040 |
|  | Charpy impact strength (kJ/m$^2$) | 13 | 19 | 13 | 9 | 7 |
| Surface impact strength | Dropping height 0.3 m | AAA | AAA | AAA | AAA | AAA |
|  | Dropping height 0.5 m | AAA | AAA | AAA | AAA | AAA |
|  | Dropping height 0.7 m | AAA | AAA | AAA | AAA | AAA |
|  | Dropping height 1.0 m | AAA | AAA | AAA | AAB | ABB |
|  | Dropping height 1.3 m | AAA | AAA | AAA | ABB | BBC |

TABLE 5

|  | Composition | Comparative Example 1 | Comparative Example 2 | Comparative Example 3 | Comparative Example 4 | Comparative Example 5 | Comparative Example 6 |
|---|---|---|---|---|---|---|---|
| Resin Composition | PS Resin A-2 | 40 | 40 | 40 | 40 | 50 | 40 |
|  | PET Resin B-3 | 60 | 60 | 60 | 60 | 50 | 60 |
|  | Graft copolymer C-1 | | | | | 6 | 21 |
|  | Comparative polymer C-9 | 6 | | | | | |
|  | Comparative polymer C-10 | | 6 | | | | |
|  | Comparative polymer C-11 | | | 6 | | | |
|  | Antioxidant | 0.2 | 0.2 | 0.2 | 0.2 | 0.2 | 0.2 |
| Evaluation result | | | | | | | |
| Heat resistance | DTUL (1.8 MPa) | 67.5 | 69.0 | 69.5 | 66.5 | 70.0 | 67.9 |
| Mechanical characteristics | Tensile strength (MPa) | 50 | 51 | 51 | 49 | 47.0 | 50 |
|  | Tensile elongation at break (%) | 6 | 9 | 12 | 3 | 5 | 101 |

TABLE 5-continued

|  | Composition | Comparative Example 1 | Comparative Example 2 | Comparative Example 3 | Comparative Example 4 | Comparative Example 5 | Comparative Example 6 |
|---|---|---|---|---|---|---|---|
|  | Modulus of elasticity in tension (MPa) | 2050 | 2100 | 2120 | 2010 | 2020 | 2220 |
|  | Charpy impact strength (kJ/m$^2$) | 3 | 4 | 5 | 1 | 3 | 16 |
| Surface impact strength | Dropping height 0.3 m | CCC | AAA | AAA | CCC | CCC | AAA |
|  | Dropping height 0.5 m | CCC | BBB | AAA | CCC | CCC | AAA |
|  | Dropping height 0.7 m | CCC | BBC | BBB | CCC | CCC | AAA |
|  | Dropping height 1.0 m | CCC | CCC | BBC | CCC | CCC | BBC |
|  | Dropping height 1.3 m | CCC | CCC | CCC | CCC | CCC | CCC |

As understood from Tables 3 to 5, the resin molded articles of Examples 1 to 16 obtained from the resin compositions having the PS resins, the PET resins, the glycidyl group-containing polyethylene graft copolymers have enhanced surface impact strength, compared with the resin molded article of Comparative Example 4 obtained from the resin composition constituted with the PS resin and the PET resin. In addition, the resin molded articles of Examples 1 to 16 in which with respect to the total amounts of the PS resins and the PET resins, the contents of the PS resins satisfy the range of 10% by weight to 40% by weight, and the contents of the PET resins satisfy the range of 60% by weight to 90% by weight, and the contents of the glycidyl group-containing polyethylene graft copolymers satisfy the range of 3% by weight to 20% by weight with respect to 100 parts by weight of the total amounts of the PS resins and the PET resins have enhanced surface impact strength, compared with the resin molded articles of Comparative Examples 1 to 3 and Comparative Examples 5 and 6 in which the above ranges are not satisfied.

In addition, the resin molded article of Example 1 in which the content of the glycidyl group-containing (meth) acrylic acid ester unit in the glycidyl group-containing polyethylene graft copolymer is in the range of 5% by weight to 20% by weight has further enhanced surface impact strength, compared with Examples 4 and 5 in which the above ranges are not satisfied. In addition, the resin molded article of Example 1 in which the polymerizable vinyl monomer which constitutes the graft portion of the copolymer is styrene has further enhanced surface impact strength, compared with Example 8 in which styrene is not used. Further, Examples 1 and 14 using the PET resins of which the acid values are in the range of 10 eq/t to 15 eq/t have further enhanced surface impact strength, compared with Examples 15 and 16 using the PET resins in which the above ranges are not satisfied.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
   a polystyrene resin;
   a polyethylene terephthalate resin; and
   a glycidyl group-containing polyethylene graft copolymer,
   wherein:
   a content of the polystyrene resin with respect to a total amount of the polystyrene resin and the polyethylene terephthalate resin is in a range of 10% by weight to 40% by weight;
   a content of the polyethylene terephthalate resin with respect to a total amount of the polystyrene resin and the polyethylene terephthalate resin is in a range of 60% by weight to 90% by weight;
   a content of the glycidyl group-containing polyethylene graft copolymer with respect to a total amount of the polystyrene resin and the polyethylene terephthalate resin is in a range of 3% by weight to 20% by weight;
   a content of the polystyrene resin with respect to a total amount of the polystyrene resin, the polyethylene terephthalate resin, and the glycidyl group-containing poly ethylene graft copolymer is in a range of 33% by weight to 39% by weight;
   a content of the polyethylene terephthalate resin with respect to the total amount of the polystyrene resin, the polyethylene terephthalate resin, and the glycidyl group-containing polyethylene graft copolymer is in a range of 50% by weight to 85% by weight;
   a content of the glycidyl group-containing polyethylene graft copolymer with respect to the total amount of the polystyrene resin, the polyethylene terephthalate resin, and the glycidyl group-containing polyethylene graft copolymer is in a range of 2.9% by weight to 5.7% by weight; and
   the glycidyl group-containing polyethylene graft copolymer is a copolymer obtained by graft-polymerizing a polymerizable vinyl monomer to a polyethylene copolymer comprising a glycidyl group-containing (meth)acrylic acid ester unit and an ethylene unit.

2. The resin composition according to claim 1,
   wherein a content of the glycidyl group-containing (meth) acrylic acid ester unit with respect to the glycidyl group-containing polyethylene graft copolymer is in a range of 5% by weight to 20% by weight and a glass transition point of the polyethylene copolymer is 0° C. or lower.

3. The resin composition according to claim 1,
   wherein the polymerizable vinyl monomer is styrene.

4. The resin composition according to claim 2,
   wherein the polymerizable vinyl monomer is styrene.

5. The resin composition according to claim 1,
   wherein an acid value of the polyethylene terephthalate resin is in the range of 10 eq/t to 15 eq/t.

6. The resin composition according to claim 2,
   wherein an acid value of the polyethylene terephthalate resin is in the range of 10 eq/t to 15 eq/t.

7. The resin composition according to claim 3, wherein an acid value of the polyethylene terephthalate resin is in the range of 10 eq/t to 15 eq/t.

8. The resin composition according to claim 4, wherein an acid value of the polyethylene terephthalate resin is in the range of 10 eq/t to 15 eq/t.

9. The resin composition according to claim 1, wherein:
   the content of the polyethylene terephthalate resin with respect to a total amount of the polystyrene resin and the polyethylene terephthalate resin is in a range of 70% by weight to 80% by weight.

10. The resin composition according to claim 1, wherein the glycidyl group-containing polyethylene graft copolymer has a weight average molecular weight of from 3,000 to 100,000.

11. A resin molded article containing the resin composition according to claim 1.

* * * * *